(12) United States Patent
Ramirez Llanos

(10) Patent No.: US 10,984,553 B2
(45) Date of Patent: Apr. 20, 2021

(54) REAL-TIME TRAILER COUPLER LOCALIZATION AND TRACKING

(71) Applicant: Continental Automotive Systems, Inc., Auburn Hills, MI (US)

(72) Inventor: Eduardo Jose Ramirez Llanos, Auburn Hills, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 16/399,857

(22) Filed: Apr. 30, 2019

(65) Prior Publication Data

US 2019/0340787 A1 Nov. 7, 2019

Related U.S. Application Data

(60) Provisional application No. 62/665,276, filed on May 1, 2018.

(51) Int. Cl.
*G06T 7/73* (2017.01)
*B60D 1/36* (2006.01)
(Continued)

(52) U.S. Cl.
CPC .............. *G06T 7/75* (2017.01); *B60D 1/36* (2013.01); *B60R 1/00* (2013.01); *G05D 1/0251* (2013.01);
(Continued)

(58) Field of Classification Search
CPC ... B60D 1/36; B60D 1/06; B60D 1/04; B60D 1/64; B60R 1/00; B60R 2300/808;
(Continued)

(56) References Cited

U.S. PATENT DOCUMENTS

2009/0236825 A1* 9/2009 Okuda ............... B60D 1/36
280/477
2010/0219010 A1* 9/2010 Kadowaki .......... B62D 15/0285
180/204
(Continued)

FOREIGN PATENT DOCUMENTS

CN 205426175 U 8/2016
DE 102016210376 A1 12/2016
(Continued)

OTHER PUBLICATIONS

Yousef Atoum et al., "Monocular Video-Based Trailer Coupler Detection using Multiplexer Convolutional Neural Network", 2017 IEEE International Conference on Computer Vision (ICCV), Oct. 22-29, 2017, ISSN: 2380-7504.
(Continued)

*Primary Examiner* — Allahyar Kasraian

(57) ABSTRACT

A method for detecting and localizing a trailer coupler of a trailer is provided. The method includes receiving images from a camera positioned on a back portion of a tow vehicle and determining a region of interest within the images. The region of interest includes a representation of the trailer coupler. The method includes determining a camera plane and a road plane. In addition, the method includes determining a three-dimensional point cloud representing objects inside the region of interest and within the camera plane and the road plane. The method also includes receiving sensor data from a sensor system and determining a coupler location of the trailer coupler based on the 3D point cloud and the sensor data. The method also includes sending instructions to a drive system causing the tow vehicle to autonomously drive along a path in a rearward direction towards the coupler location.

20 Claims, 8 Drawing Sheets

(51) Int. Cl.
*B60R 1/00* (2006.01)
*G05D 1/02* (2020.01)
*H04N 5/225* (2006.01)
*B60D 1/06* (2006.01)

(52) U.S. Cl.
CPC ............ *B60D 1/06* (2013.01); *B60R 2300/30* (2013.01); *B60R 2300/808* (2013.01); *G05D 2201/0213* (2013.01); *G06T 2207/10028* (2013.01); *G06T 2207/20104* (2013.01); *G06T 2207/30252* (2013.01); *H04N 5/2253* (2013.01)

(58) Field of Classification Search
CPC ................ B60R 2300/30; B60R 1/003; B60R 2300/305; B60R 2300/301; G06T 2207/30252; G06T 2207/10028; G06T 7/70; G06T 7/75; G06T 2207/20104; G06T 7/60; B62D 13/06; B62D 15/023; B62D 15/0285; G06K 9/00791; G06K 9/3233; G06K 9/3241; G05D 1/0251; B60W 30/18036; H04N 5/2253
See application file for complete search history.

(56) References Cited

U.S. PATENT DOCUMENTS

| | | | | |
|---|---|---|---|---|
| 2012/0274625 A1* | 11/2012 | Lynch | ..................... | G06T 19/00 345/419 |
| 2015/0321666 A1* | 11/2015 | Talty | .................... | G05D 1/0259 701/41 |
| 2016/0039456 A1 | 2/2016 | Lavoie et al. | | |
| 2016/0052548 A1 | 2/2016 | Singh et al. | | |
| 2016/0086333 A1 | 3/2016 | Scholl et al. | | |
| 2016/0110878 A1* | 4/2016 | Chang | ..................... | G06T 7/73 382/103 |
| 2016/0153767 A1* | 6/2016 | Ihlenfeldt | ................ | G01C 3/08 33/503 |
| 2016/0375831 A1* | 12/2016 | Wang | .................. | B62D 15/0295 348/148 |
| 2016/0378118 A1* | 12/2016 | Zeng | ..................... | B60D 1/62 701/28 |
| 2017/0151846 A1* | 6/2017 | Wuergler | ................. | B60D 1/62 |
| 2017/0174022 A1* | 6/2017 | Hu | ........................ | G06T 7/20 |
| 2018/0039278 A1* | 2/2018 | Huger | .................. | B62D 15/029 |
| 2018/0215382 A1* | 8/2018 | Gupta | ............. | B60W 30/18036 |
| 2018/0251153 A1* | 9/2018 | Li | ........................ | B60D 1/06 |
| 2018/0272941 A1* | 9/2018 | Bliss | ........................ | B60D 1/62 |
| 2018/0276838 A1* | 9/2018 | Gupta | ........................ | G06T 7/73 |
| 2018/0361929 A1* | 12/2018 | Zhang | .................... | H04N 7/181 |
| 2019/0016264 A1* | 1/2019 | Potnis | ..................... | B60D 1/64 |
| 2019/0094872 A1* | 3/2019 | Li | ........................ | G05D 1/0231 |
| 2019/0308473 A1* | 10/2019 | Yu | ........................ | B60D 1/363 |
| 2019/0335100 A1* | 10/2019 | Chen | ........................ | B60R 1/00 |
| 2020/0090360 A1* | 3/2020 | Starr | ........................ | G06T 7/60 |
| 2020/0148257 A1* | 5/2020 | Niewiadomski | ... | B62D 15/0285 |

FOREIGN PATENT DOCUMENTS

| | | |
|---|---|---|
| EP | 3086196 A1 | 10/2016 |
| EP | 3171334 A1 | 5/2017 |
| EP | 3299191 A | 2/2018 |
| GB | 2554427 A | 4/2018 |
| WO | 2017220705 A1 | 12/2017 |

OTHER PUBLICATIONS

International Search Report and the Written Opinion of the International Searching Authority dated Jul. 24, 2019 for the counterpart PCT Application No. PCT/2019/030260.

* cited by examiner

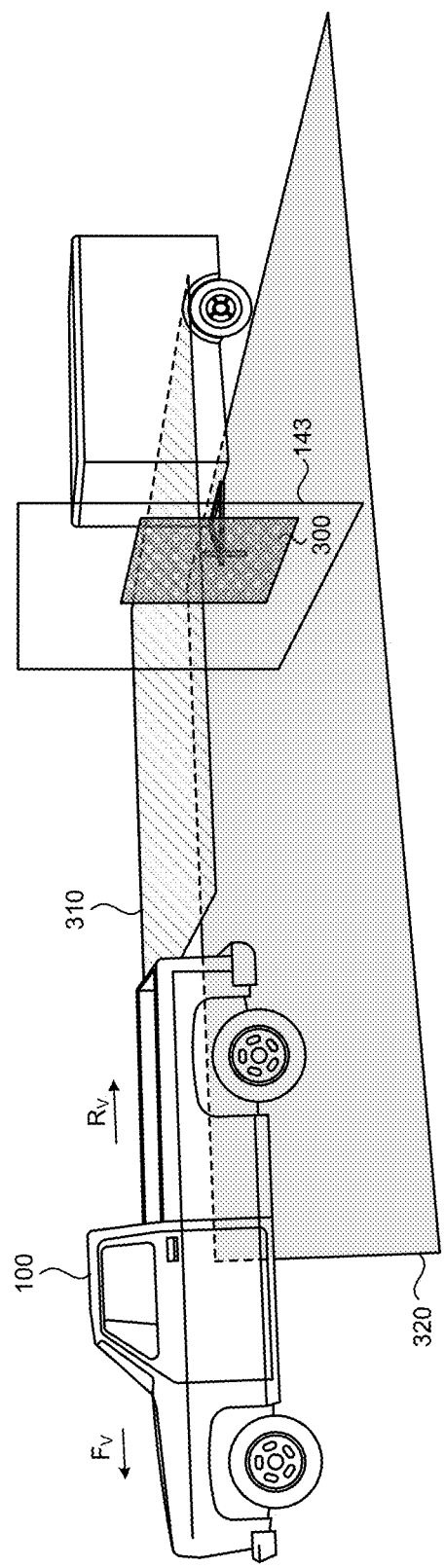

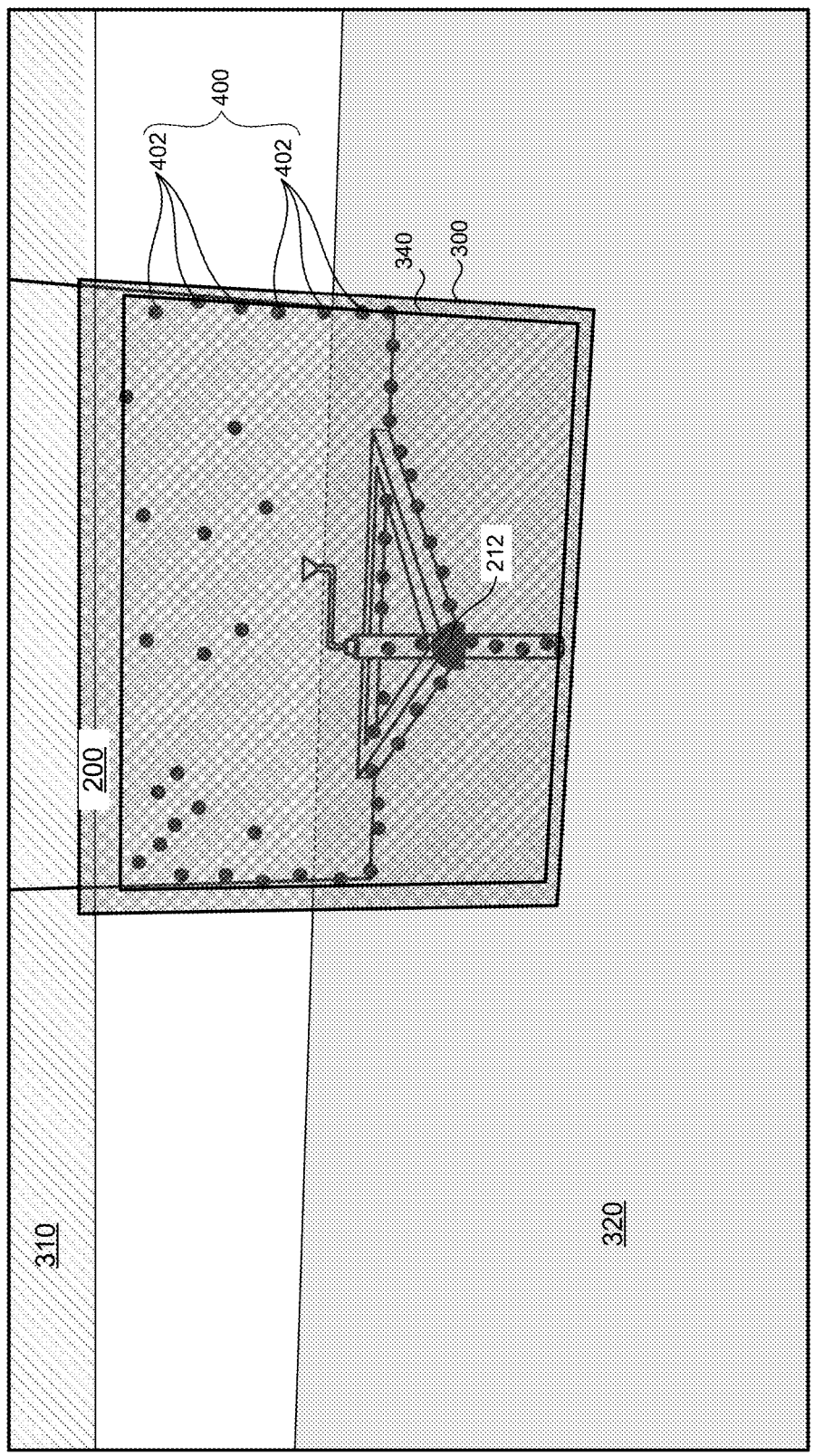

REAL-TIME TRAILER COUPLER LOCALIZATION AND TRACKING

CROSS REFERENCE TO RELATED APPLICATIONS

This U.S. patent application claims priority under 35 U.S.C. § 119(e) to U.S. Provisional Application 62/665,276, filed on May 1, 2018, which is hereby incorporated by reference in its entirety.

TECHNICAL FIELD

This disclosure relates to a method and device for real-time coupler localization and tracking.

BACKGROUND

Trailers are usually unpowered vehicles that are pulled by a powered tow vehicle. A trailer may be a utility trailer, a popup camper, a travel trailer, livestock trailer, flatbed trailer, enclosed car hauler, and boat trailer, among others. The tow vehicle may be a car, a crossover, a truck, a van, a sports-utility-vehicle (SUV), a recreational vehicle (RV), or any other vehicle configured to attach to the trailer and pull the trailer. The trailer may be attached to a powered vehicle using a trailer hitch. A receiver hitch mounts on the tow vehicle and connects to the trailer hitch to form a connection. The trailer hitch may be a ball and socket, a fifth wheel and gooseneck, or a trailer jack. Other attachment mechanisms may also be used. In addition to the mechanical connection between the trailer and the powered vehicle, in some examples, the trailer is electrically connected to the tow vehicle. As such, the electrical connection allows the trailer to take the feed from the powered vehicle's rear light circuit, allowing the trailer to have taillights, turn signals, and brake lights that are in sync with the lights of the powered vehicle.

Recent advancements in sensor technology have led to improved safety systems for vehicles. As such, it is desirable to provide a system that is capable of identifying a coupler of a trailer positioned behind a tow vehicle in real-time and localizing the coupler which allows the tow vehicle to autonomously maneuver towards the trailer for automated hitching.

SUMMARY

One aspect of the disclosure provides a method of detecting and localizing a trailer coupler of a trailer. The method includes: receiving, at data processing hardware, images from a camera positioned on a back portion of a tow vehicle and in communication with the data processing hardware. The method also includes determining, by the data processing hardware, a region of interest within the images. The region of interest includes a representation of the trailer coupler. The method also includes determining, by the data processing hardware, a camera plane where the camera moves based on the received images. In addition, the method includes determining, by the data processing hardware, a road plane based on the received images. The method also includes determining, by the data processing hardware, a three-dimensional (3D) point cloud representing objects inside the region of interest and within the camera plane and the road plane. The method includes receiving, at the data processing hardware, sensor data from at least one of wheel encoder, acceleration and wheel angle sensors, and an inertial measurement unit in communication with the data processing hardware. The method includes determining, at the data processing hardware, a coupler location of the trailer coupler based on the 3d point cloud and the sensor data. The coupler location is in real world coordinates. Additionally, the method includes sending, from the data processing hardware to a drive system, instructions causing the tow vehicle to autonomously drive along a path in a rearward direction towards the coupler location.

Implementations of the disclosure may include one or more of the following optional features. In some implementations, determining the region of interest within the images includes: sending, from the data processing hardware to a display, instructions to display the received images; and receiving, at the data processing hardware, a user selection of the region of interest.

In some examples, the method further includes: projecting, by the data processing hardware, points associated with the 3D point cloud onto the camera plane or the road plane. The method may include determining, by the data processing hardware, a distance between each point and the camera. When the points associated with the 3D point cloud are projected onto the camera plane, the method includes determining the distance between each point and a center of the camera. When the points associated with the 3D point cloud are projected onto the road plane, the method includes determining the distance between each point and a projection of the center of the camera onto the road plane. The method may also include determining, by the data processing hardware, a shortest distance based on the determined distances, where a projection of the 3D point associated with the shortest distance onto the received images is representative of a coupler pixel location within the images. The coupler location is based on the coupler pixel location.

In some examples, the method further includes: determining, by the data processing hardware, a coupler height based on a distance between the 3D point associated with the shortest distance and the road plane. The coupler location includes the coupler height.

The method may further include: determining, by the data processing hardware, a first distance between the trailer coupler and the camera based on the 3D point cloud; and determining, by the data processing hardware, a second distance between the trailer coupler and a vehicle tow ball based on the first distance less than a longitudinal distance between the camera and a vehicle hitch ball. The path is based on the second distance.

In some implementations, determining the point cloud of the region of interest includes executing one of a visual odometry (VO) algorithm, a simultaneous localization and mapping (SLAM) algorithm, and a structure from motion (SfM) algorithm.

Determining the camera plane may include: determining, by the data processing hardware, at least three three-dimensional positions of the rear camera from the received image; and determining, by the data processing hardware, the camera plane based on the at least three three-dimensional positions. In some examples determining the road plane includes: determining a height of the camera from a road supporting the tow vehicle; and shifting the camera plane by the height of the camera.

In some implementations, determining the road plane includes: extracting, by the data processing hardware, at least three feature points from the images including a road; and associating, by the data processing hardware, a point of the 3D point cloud with each of the feature points. Additionally, determining the road plane may include determining, by the data processing hardware, the road plane based on the at least three points of the 3D point cloud associated with the at least three feature points. In some examples, determining the camera plane includes: determining, by the data processing hardware, a height of the camera from the road and shifting, by the data processing hardware, the road plane by the height of the camera.

Another aspect of the disclosure provides a system for detecting and localizing a trailer coupler of a trailer. The system includes: data processing hardware; and memory hardware in communication with the data processing hardware. The memory hardware stores instructions that when executed on the data processing hardware cause the data processing hardware to perform operations that include the method described above.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 4A is a perspective view of the tow vehicle and the trailer showing a captured image and the region of interest.

FIG. 5B is a perspective view of the tow vehicle and the trailer showing a captured image, the region of interest, and a minimum region of interest.

Like reference symbols in the various drawings indicate like elements.

DETAILED DESCRIPTION

Figure 1:
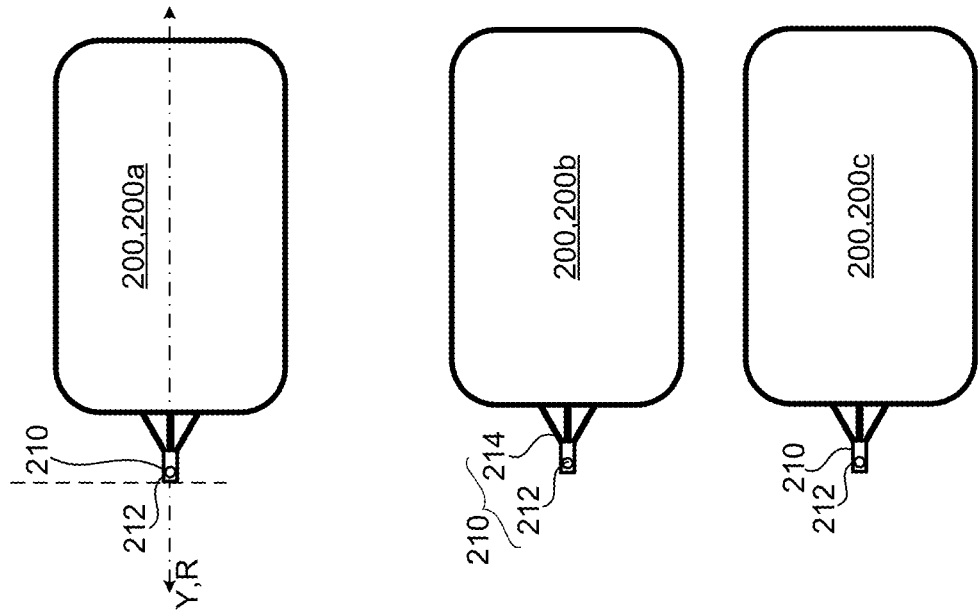
FIG. 1 is a schematic top view of an exemplary tow vehicle positioned in front of trailers.
Figure 1:
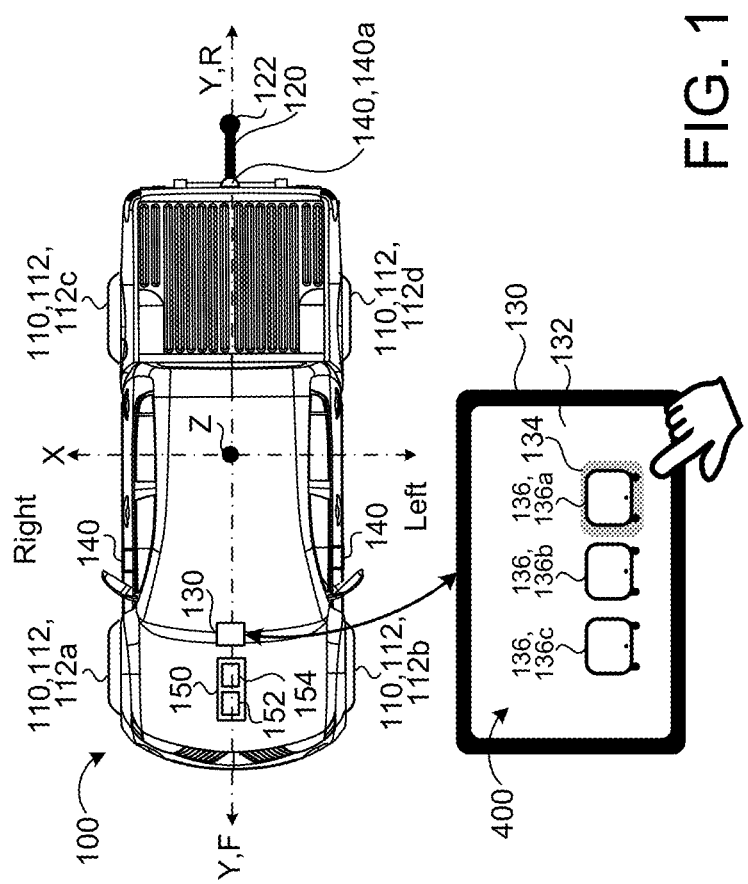
Figure 2:
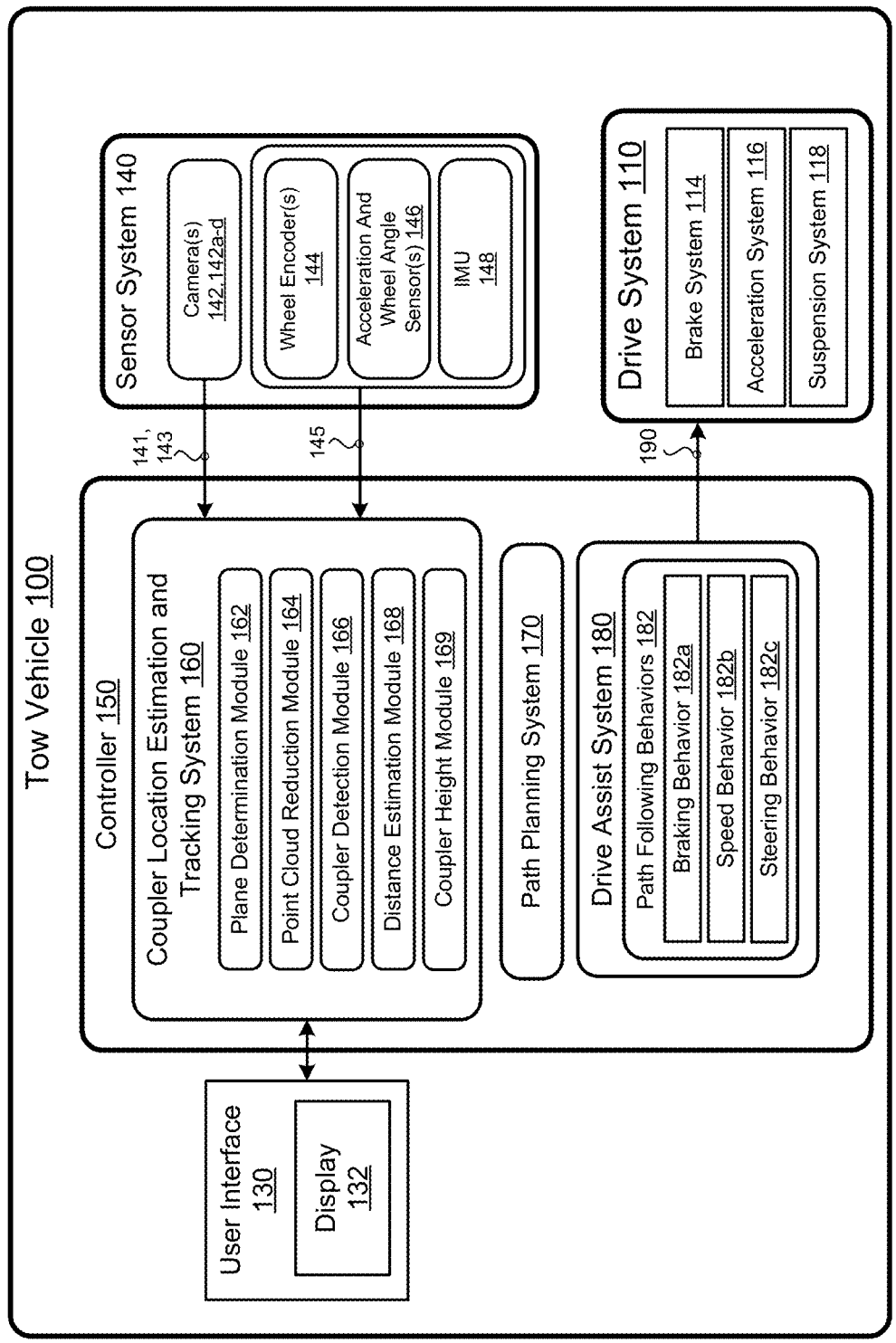
FIG. 2 is a schematic view of the exemplary tow vehicle shown in FIG. 1.

Referring to FIGS. 1 and 2, a tow vehicle 100, such as, but not limited to a car, a crossover, a truck, a van, a sports-utility-vehicle (SUV), and a recreational vehicle (RV) may be configured to hitch to and tow a trailer 200. The tow vehicle 100 connects to the trailer 200 by way of a tow vehicle hitch 120 having a vehicle hitch ball 122 connecting to a trailer hitch 210 having a trailer coupler 212. It is desirable to have a tow vehicle 100 that is capable of autonomously backing up towards a trailer 200 identified from one or more representations 136, 136a-c of trailers 200, 200a-c displayed on a user interface 130, such as a user display 132. In addition, it is also desirable to have a coupler location estimation and tracking system 160 supported by the tow vehicle 100 that is capable of executing an algorithm that tracks and estimates the position of the coupler 212 associated with the trailer 200 in real time. Therefore, the coupler location estimation and tracking system 160 automates the hitching process of the tow vehicle 100 to the trailer 200. The coupler location estimation and tracking system 160 may use a single camera 142a and at least one of the following sensors: wheel encoders 144, acceleration and wheel angle sensors 146, and an Inertial Measurement unit (IMU) 148 to determine a position of the coupler 212 in pixel coordinates within an image 143 as well as the coupler position in the three-dimensions (3D) world.

Referring to FIGS. 1-5, in some implementations, a driver of a tow vehicle 100 wants to tow a trailer 200 positioned behind the tow vehicle 100. The tow vehicle 100 may be configured to receive an indication of a driver selection 134 associated with a representation of a selected trailer 200, 200a-c. In some examples, the driver maneuvers the tow vehicle 100 towards the selected trailer 200, 200a-c, while in other examples, the tow vehicle 100 autonomously drives towards the selected trailer 200, 200a-c. The tow vehicle 100 may include a drive system 110 that maneuvers the tow vehicle 100 across a road surface 10 based on drive commands having x, y, and z components, for example. As shown, the drive system 110 includes a front right wheel 112, 112a, a front left wheel 112, 112b, a rear right wheel 112, 112c, and a rear left wheel 112, 112d. The drive system 110 may include other wheel configurations as well. The drive system 110 may also include a brake system 114 that includes brakes associated with each wheel 112, 112a-d, and an acceleration system 116 that is configured to adjust a speed and direction of the tow vehicle 100. In addition, the drive system 110 may include a suspension system 118 that includes tires associates with each wheel 112, 112a-d, tire air, springs, shock absorbers, and linkages that connect the tow vehicle 100 to its wheels 112, 112a-d and allows relative motion between the tow vehicle 100 and the wheels 112, 112a-d. The suspension system 118 may be configured to adjust a height of the tow vehicle 100 allowing a tow vehicle hitch 120 (e.g., a vehicle hitch ball 122) to align with a trailer hitch 210 (e.g., trailer hitch coupler 212), which allows for autonomous connection between the tow vehicle 100 and the trailer 200.

The tow vehicle 100 may move across the road surface by various combinations of movements relative to three mutually perpendicular axes defined by the tow vehicle 100: a transverse axis X, a fore-aft axis Y, and a central vertical axis Z. The transverse axis X extends between a right side and a left side of the tow vehicle 100. A forward drive direction along the fore-aft axis Y is designated as F, also referred to as a forward motion. In addition, an aft or rearward drive direction along the fore-aft direction Y is designated as R, also referred to as rearward motion. When the suspension system 118 adjusts the suspension of the tow vehicle 100, the tow vehicle 100 may tilt about the X axis and or Y axis, or move along the central vertical axis Z.

The tow vehicle 100 may include a user interface 130. The user interface 130 receives one or more user commands from the driver via one or more input mechanisms or a screen display 132 (for examples, a touch screen display) and/or displays one or more notifications to the driver. The user interface 130 is in communication with a vehicle controller 150, which is in turn in communication with a sensor system 140. In some examples, the user interface 130 displays an image of an environment of the tow vehicle 100 leading to one or more commands being received by the user interface 130 (from the driver) that initiate execution of one or more behaviors. In some examples, the user display 132 displays one or more representations 136, 136a-c of trailers 200, 200a-c positioned behind the tow vehicle 100. In this case, the driver selects a representation 136, 136a-c of a trailer 200, 200a-c causing the controller 150 to execute the coupler location estimation and tracking system 160 associated with the trailer 200, 200a-c of the selected representation 136, 136a-c. In some examples, where the user display 132 displays one representation 136, 136a-c of a trailers 200, 200a-c positioned behind the tow vehicle 100, the controller 150 may execute the coupler location estimation and tracking system 160 associated with the one trailer 200, 200a-c of the one representation 136, 136a-c automatically or upon an indication from the driver to autonomously attach to the trailer 200, 200a-c. The vehicle controller 150 includes a computing device (or processor or data processing hardware) 152 (e.g., central processing unit having one or more computing processors) in communication with non-transitory memory 154 (e.g., a hard disk, flash memory, random-access memory, memory hardware) capable of storing instructions executable on the computing processor(s) 152.

The tow vehicle 100 may include a sensor system 140 to provide reliable and robust driving. The sensor system 140 may include different types of sensors that may be used separately or with one another to create a perception of the environment of the tow vehicle 100. The perception of the environment is used for to aid the driver in making intelligent decisions based on objects and obstacles detected by the sensor system 140 or during autonomous driving of the tow vehicle 100. The sensor system 140 may include the one or more cameras 142. In some implementations, the tow vehicle 100 includes a rear camera 142a that is mounted to provide images 143 with a view of a rear-driving path for the tow vehicle 100. The rear camera 142a may include a fisheye lens that includes an ultra wide-angle lens that produces strong visual distortion intended to create a wide panoramic or hemispherical image 143. Fisheye cameras capture images 143 having an extremely wide angle of view. Moreover, images 143 captured by the fisheye camera have a characteristic convex non-rectilinear appearance. Other types of cameras may also be used to capture images 143 of the rear-driving path of the tow vehicle 100.

In some examples, the sensor system 140 also includes one or more wheel encoders 144 associated with one or more wheels 112, 112a-d of the tow vehicle 100. The wheel encoder 144 is an electro-mechanical device that converts an angular position or motion of the wheel to analog or digital output signals. Therefore, the wheel encoder 144 determines the speed and distance the wheel 112, 112a-d has traveled.

The sensor system 140 may also include one or more acceleration and wheel angle sensors 146 associated with the tow vehicle 100. The acceleration and wheel angle sensors 146 determine the acceleration of the tow vehicle 100 in the directions of the transverse axis X and fore-aft axis Y.

The sensor system 140 may also include the IMU (inertial measurement unit) 148 configured to measure the tow vehicle's linear acceleration (using one or more accelerometers) and rotational rate (using one or more gyroscopes). In some examples, the IMU 148 also determines a heading reference of the tow vehicle 100. Therefore, the IMU 148 determines the pitch, roll, and yaw of the tow vehicle 100.

The sensor system 140 may include other sensors such as, but not limited to, radar, sonar, LIDAR (Light Detection and Ranging, which can entail optical remote sensing that measures properties of scattered light to find range and/or other information of a distant target), LADAR (Laser Detection and Ranging), ultrasonic sensors, stereo cameras, etc. The wheel encoders 144, the acceleration and wheel angle sensors 146, the IMU 148, and any other sensors output sensor data 145 to the controller 150, i.e., the coupler location estimation and tracking system 160.

The vehicle controller 150 executes the coupler location estimation and tracking system 160 that receives images 143 from the rear camera 143a and sensor data 145 from at least one of the other sensors 144, 146, 148, and based on the received data, the coupler location estimation and tracking system 160 determines a location of the trailer 200, specifically, a coupler location $L_{TC}$ of the coupler 212 associated with the trailer 200. For example, the trailer 200, 200a-c identified by the driver via the user interface 130. More specifically, the coupler location estimation and tracking system 160 determines a pixel position of the coupler 212 within the received image(s) 143. In addition, the coupler location estimation and tracking system 160 determines a 3D location $L_{TC}$ of the coupler 212 in a three-dimensional (3D) coordinate system and in a global coordinate system. In some examples, the coupler location estimation and tracking system 160 also determines a coupler height $H_{TC}$ of the coupler 212 with respect to the road surface 10 in the 3D coordinate system and in the global coordinate system. The coupler location estimation and tracking system 160 includes an iterative algorithm that automates the hitching and alignment process for the tow vehicle 100 and the trailer 200.

The coupler location estimation and tracking system 160 receives images 143 from the rear camera 142a. Since the coupler location estimation and tracking system 160 analyzes all sequences of images 143 received from the camera 142a instead of only one or two images 143, for example, the coupler location estimation and tracking system 160 is more robust when making its determinations relating to the coupler location $L_{TC}$ of the coupler 212.

Figure 4B:
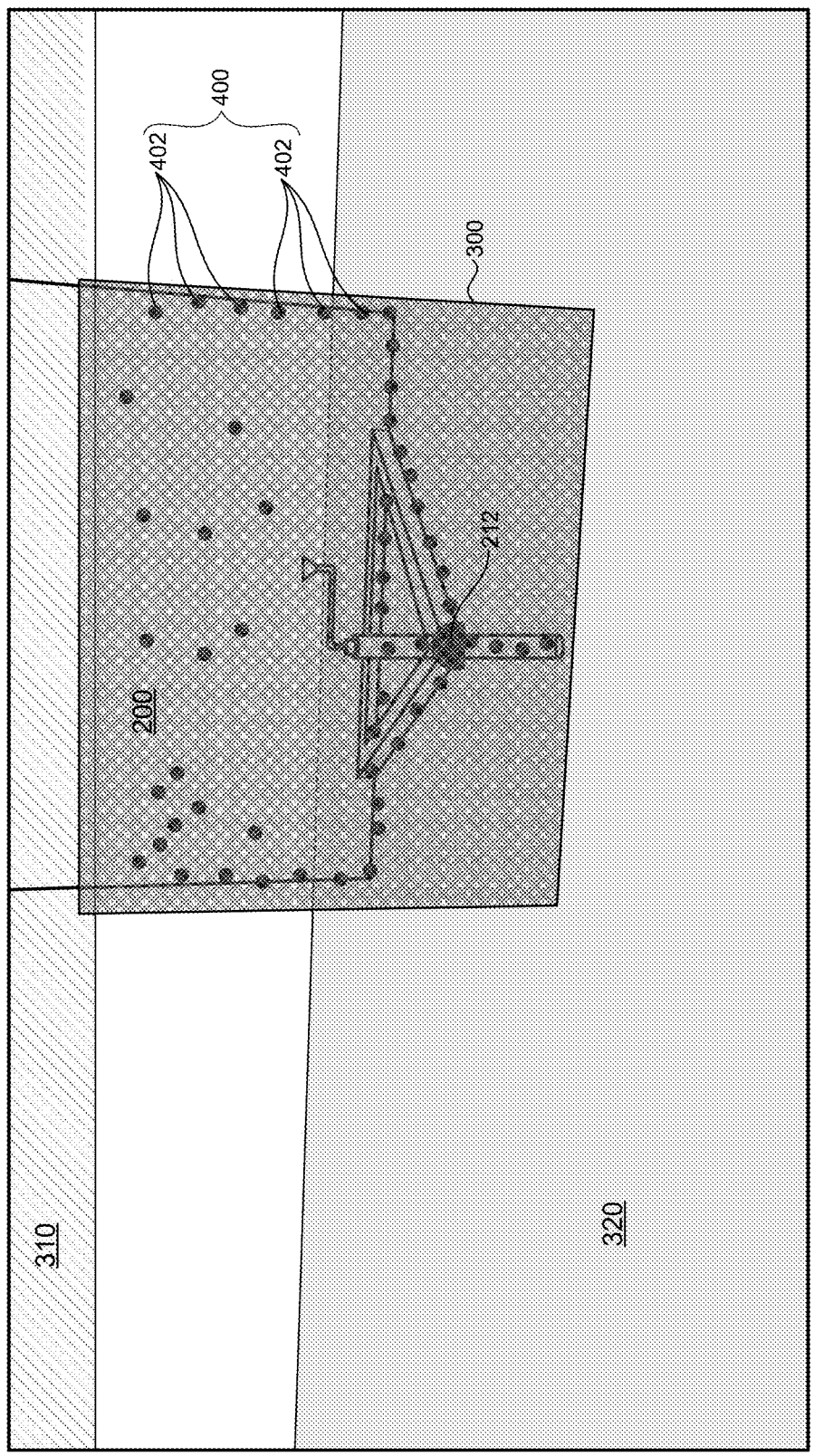
FIG. 4B is a perspective view of the semi-dense or dense point cloud for a region of interest within a captured image.
Figure 5A:
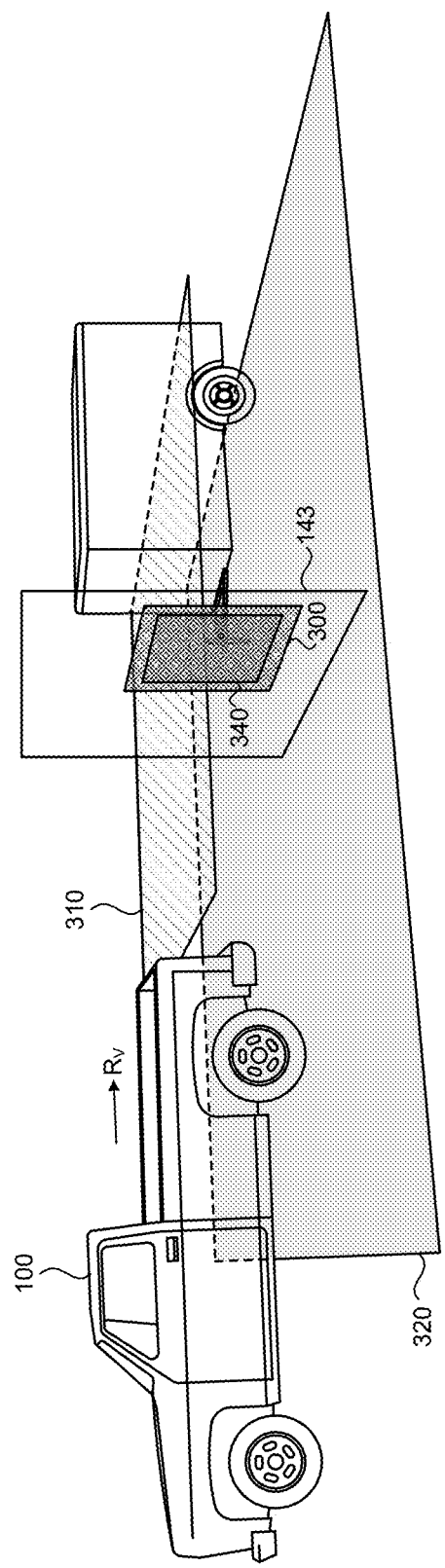
FIG. 5A is a perspective view of the tow vehicle and the trailer showing a captured image, the region of interest, and a minimum region of interest.

In some implementations, the coupler location estimation and tracking system 160 instructs the user interface 130 to display the received images 143 on the display 132 and solicit from the user a selection of a region of interest (ROI) 300 within the displayed image 143 (FIGS. 4A and 4B). The ROI 300 is a bounding box that includes the coupler 212. In other examples, the coupler location estimation and tracking system 160 may include a coupler identification algorithm that identifies the coupler 212 within the image 143 and bounds the coupler 212 by the bounding box being the ROI 300.

The coupler location estimation and tracking system 160 generates a semi-dense/dense point cloud of the objects within the ROI 300, for examples, the coupler 212 (FIG. 4B). A point cloud is a set of data points in 3D space, more specifically the point cloud includes a number of points on the external surface of objects.

The coupler location estimation and tracking system 160 may use one or more techniques to localize the coupler 212 in the point cloud 400. Some of these techniques include, but are not limited to, Visual Odometry (VO), Simultaneous Localization and Mapping (SLAM), and Structure from Motion (SfM). The VO, SLAM and SfM frameworks are well established theories and allow the tow vehicle 100 to localize in a real-time in a self-generated 3D point cloud map. VO is a method of determining a position and orientation of the trailer 200, the camera 142a, the coupler 212, or the tow-bar 214 by analyzing the images 143 received from the camera 142a. The VO method may extract image feature points and tracks them in the image sequence. Examples of the feature points may include, but are not limited to, edges, corners or blobs on the trailer 200, the coupler 212, or the tow-bar 214. The VO method may also use pixel intensity in the image sequence directly as visual input. The SLAM method constructs or updates a map of an unknown environment while simultaneously keeping track of one or more targets. In other words, the SLAM method uses the received images 143 as the only source of external information, to establish the position and orientation of the tow vehicle 100 and the camera 142a, while at the same time, constructs a representation of the objects in the ROI 300. The SfM method estimates the 3D structure of the objects in the ROI 300 based on the received images 143 (i.e., 2D images). The SfM method may estimate a pose of the camera 142a and the tow vehicle 100 based on the sequence of images 143 that the camera 142 captures.

In some implementations, the coupler location estimation and tracking system 160 is initialized before executing the VO method, the SLAM method or the SfM method. During a first method of initializing, the coupler location estimation and tracking system 160 sends the drive system 110 instructions or commands 190 causing the drive system 110 to move the tow vehicle 100 in a straight direction along the fore-aft axis Y, for example, in the forward drive direction F or rearward drive direction R for a predetermined distance. In some examples, the predetermined distance is a few centimeters. The predetermined distance may be between 5 centimeters to 50 centimeters. The forward F and rearward R drive movement along the fore-aft axis Y causes the SLAM or the SfM to initialize. Additionally, along the forward F and rearward R drive movement, the coupler location estimation and tracking system 160 executes a tracker algorithm to update the ROI 300 within the image 143 that was provided by the driver or determined by the coupler location estimation and tracking system 160. As the tow vehicle 100 moves in the rearward direction R, the perspective and the size of the trailer 200, tow-bar 214, and coupler 212 changes in the image 143. Therefore, the tracker algorithm updates the ROI 300 based on the new images 143 that are received from the camera 142a during the forward F and rearward R drive movement along the fore-aft axis Y. The ROI 300 includes the coupler 212, as such the feature points or pixel intensities in the ROI 300 are tracked by the coupler location estimation and tracking system 160. The ROI 300 is used to filter out objects that are not the coupler 212 in the image 143 since the coupler location estimation and tracking system 160 only analyzes the ROI 300 portion of the image 143. In some examples, the coupler location estimation and tracking system 160 constructs a visual tracker of the coupler 212 by identifying two-dimensional (2D) feature points in the ROI 300. Then the coupler location estimation and tracking system 160 identifies the 3D points within the point cloud map that correspond to the identified 2D feature points. Therefore, at every iteration of the tracking algorithm (executed by the coupler location estimation and tracking system 160), the coupler location estimation and tracking system 160 projects the selected cloud point 402 onto the 2D camera image 143. Then the coupler location estimation and tracking system 160 constructs a minimum ROI 340 that includes the projected 2D points. In this case, the coupler location estimation and tracking system 160 updates the ROI 300 while the tow vehicle is moving and generates a minimum ROI 340 that contains the previously selected cloud point 402.

In some implementations, the coupler location estimation and tracking system 160 may be initialized by sending the drive system 110 instructions 190 causing the drive system 110 to move the tow vehicle 100 for a predetermined distance towards the center of the ROI 300. In some examples, the predetermined distance is a few centimeters, for example 5 centimeters to 50 centimeters. In this case, the coupler location estimation and tracking system 160 updated the ROI 300 during the sequence or received images 143 during the maneuvers of the tow vehicle 100.

In some implementations, the coupler location estimation and tracking system 160 determines a scale of the 3D point cloud map. When the 3D point cloud map is generated by using only a mono-camera, it suffers from scale ambiguity, i.e., the map made only with monocular cameras is recoverable only up to a scale. However, if the coupler location estimation and tracking system 160 does not know the scale of the map, then the coupler location estimation and tracking system 160 may determine the scale of the map by fusing the VO, SLAM, or SfM algorithms with the vehicle sensor data 145. In another examples, the coupler location estimation and tracking system 160 determines the scale of the map based on the road plane 320 in the 3D point cloud map 400. The coupler location estimation and tracking system 160 determines the distance from the camera location to the road plane 320 in the map 400. The scale of the map 400 is given by the height of the camera 142a (from the camera data 141) divided by the distance calculated of the camera location to the road plane 320 in the map 400. A 3D point cloud map represents the environment's structure without providing details relating to the distance of the structures within the map 400. Therefore, the coupler location estimation and tracking system 160 determines the scale of the map 400 which includes the distance information, and this allows the coupler location estimation and tracking system 160 to determine the location of the coupler 212 in the world coordinate.

The coupler location estimation and tracking system 160 includes a plane determination module 162 that is configured to determine a camera plane 310 and a road plane 320. In some implementations, the plane determination module 162 determines a camera plane 310 along which the camera 142a moves and a road plane 320. To determine the camera plane 310, the plane determination module 162 uses at least three previous 3D positions of the camera 142a received from the camera 142a as camera data 141. The camera data 141 may include intrinsic parameters (e.g., focal length, image sensor format, and principal point) and extrinsic parameters (e.g., the coordinate system transformations from 3D world coordinates to 3D camera coordinates, in other words, the extrinsic parameters define the position of the camera center and the heading of the camera in world coordinates). In addition, the camera data 141 may include minimum/maximum/average height of the camera 142a with respect to ground (e.g., when the vehicle is loaded and unloaded), and a longitudinal distance between the camera 142a and the vehicle hitch ball 122. The plane determination module 162 determines the camera plane 310 based on the 3D positions of the three points of the at least three previous 3D positions of the camera 142a. In some examples, the coupler location estimation and tracking system 160 determines the road plane 320 based on the camera plane 310. In some implementations, based on the camera plane 310 and the camera data 141, the plane determination module 162 determines the road plane 320 since the road plane 320 is a shift of the camera plane 310 by the height of the camera 142a from the ground (which is provided in the camera information 141). This procedure is helpful when the three 3D points used to determine the camera plane 310 are collinear, in which case there exists infinite number of camera planes 310 that are coplanar to the line given by the 3D points.

To determine the road plane 320, the plane determination module 162 extracts at least three feature points from the captured 2D image 143 associated with the road. Following, the coupler location estimation and tracking system 160 determines the 3D position of the three feature points within the point cloud 400 and then the coupler location estimation and tracking system 160 computes the road plane 320 based on the three feature points. In some examples, the coupler location estimation and tracking system 160 determines the camera plane 310 based on the road plane 320. In some implementations, based on the road plane 320 and the camera information 141, the coupler location estimation and tracking system 160 determines the camera plane since the camera plane 310 is a shift of the road plane 320 by the height of the camera 142a from the ground (which is provided by the camera information 141).

The plane determination module 162 may determine and update the planes 310, 320 in real time as the tow vehicle 100 is autonomously moving in the rearward R direction, or if the plane determination module 162 determines that the road is flat, then the coupler location estimation and tracking system 160 may determine the planes 310, 320 only once. The above methods use three points to determine the camera plane 310 or the road plane 320. However, in some examples, the plane determination module 162 may rely on more than three points to determine a plane 310, 320. In this case, the coupler location estimation and tracking system 160 uses Least squares method, Radom Sample Consensus (RANSAC) method, Support Vector Machine (SVM) method, or any variation of these algorithms to determine the plane 310, 320. By using more than three points to determine the plane 310, 320, the plane determination module 162 increases the robustness to outliers.

The coupler location estimation and tracking system 160 includes a point cloud module reduction module 164 that is configured to reduce the size of the ROI 300. In some implementations, the coupler location estimation and tracking system 160 selects the 3D cloud points 402 corresponding to the 2D points in the image 143 that are contained in the ROI 300. Then the coupler location and estimation system 160, uses the selected 3D cloud points 402 between the two planes (the road plane 320 and the camera plane 310). The selected 3D cloud points 402 between the two planes 310, 320 are denoted as set M.

In some examples, the coupler location estimation and tracking system 160 projects the set of points in M (i.e., the selected 3D cloud points 402 between the two planes 310, 320) onto the camera plane 310 or the road plane 320. The projected extracted points are denoted as set J. Following, the coupler location estimation and tracking system 160 determines a distance from each point within the set J to a center of the camera 142a.

In some implementations, if the first method of initialization is used, the coupler location estimation and tracking system 160 updates the minimum ROI 340 by projecting the points 402 in M onto the current camera 2D image 143. Then the coupler location estimation and tracking system 160 determines an updated minimum box 340 that contains the projected points in the camera frame 143 (2D image). The coupler location estimation and tracking system 160 updates the minimum ROI 340 because when time changes or the tow vehicle 100 moves, then the perspective of the 3D points 402 with respect to the camera 142a also change in position. As such, by projecting the points 402 in the set M onto the image 143, the minimum ROI 340 is updated.

Figure 3:
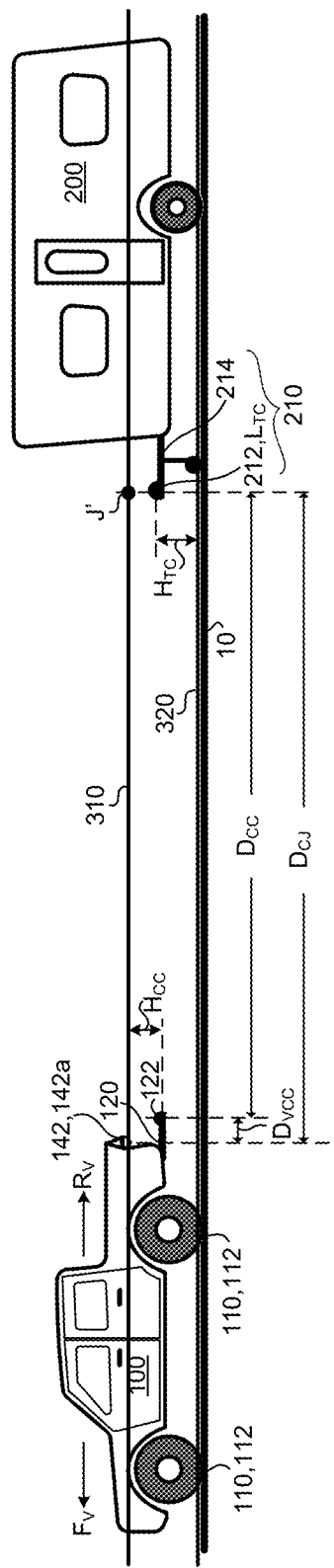
FIG. 3 is a schematic side view of the exemplary tow vehicle and a selected trailer of FIG. 1.

The coupler location estimation and tracking system 160 includes a coupler detection module 166 configured to detect the coupler 212 and determine the location $L_{TC}$ of the coupler 212. The coupler location estimation and tracking system 160 selects a point J' from the set J (i.e., the projected extracted points). The point J' is indicative of a point from set J having the shortest distance between the point J' and the camera 142a. As previously mentioned, the set J is the projection of the points 402 in set M on the camera plane 310 or the road plane 320. Therefore, when the set J is projected on the camera plane 310, then the point J' is the point which is the closest to the camera center (as shown in FIG. 3). However, if the set J is projected on the road plane 320, then the point J' is the point which is closes to a projection of the camera center onto the road plane 320. In some examples, if J' includes more than one point, then the coupler location estimation and tracking system 160 determines the average or median of the points J'. The coupler location estimation and tracking system 160 determines a point from the set M associated with J' and projects the determined point from the set M onto the 2D image 143 which is indicative of a pixel location of the coupler 212 in the image.

In some implementations, the coupler detection module 166 determines the coupler location by, given a configurable integer parameter N, the coupler location estimation and tracking system 160 selects N points in the set J which are the closest to the camera center (or the projection of the camera center on the road plane). This set of point is denoted as J*. The coupler detection module 166 determines an average or median of the set of points J*. A point in the set M associated with J* projected onto the image 143 represents an estimation of the position of the trailer coupler on the image.

In some implementations, the coupler detection module 166 determines the coupler location by executing an identification algorithm to find the coupler 212 in the point cloud 400. The identification algorithm does not try to find the coupler in the image 143. The identification algorithm looks for the coupler shape in the point cloud (3D world). Other option to simplify this step is to run the identification algorithm in the camera moving plane (or the road plane) using the points in the set J.

The coupler location estimation and tracking system 160 includes a distance estimation module 168 configured to determine a distance $D_{CC}$ between the trailer coupler 212 and the vehicle tow ball 122 (see FIG. 3). The distance estimation module 168 determines a first distance Do between J' (being the minimum distance to the camera 142a) projected to the camera moving plane 310 and the camera center (or projected on the road plane 320 and the projection of the camera center). The distance estimation module 168 determines a second distance $D_{CC}$ between the coupler 212 and the hitch ball 122 based on the first distance $D_{CJ}$ less a longitudinal distance $D_{VCC}$ between the camera 142a and the vehicle hitch ball 122. The second distance indicative of the distance $D_{CC}$ between the trailer coupler 212 and the vehicle tow ball 122.

The coupler location estimation and tracking system 160 includes a coupler height module 169 that determines a height $H_{TC}$ of the coupler 212 with respect to the road surface 10. For example, the coupler height module 169 may determine the distance between the coupler location $L_{TC}$, determined by the coupler detection module 166, and the road plane 320. The coupler height module 168 may use the shortest distance between the road plane 320 and the coupler (if the coupler is represented by more than one point in the point cloud, use the average point to represent the coupler) to determine the coupler height $H_{TC}$.

Once the coupler location estimation and tracking system 160 determines the coupler height $H_{TC}$ and the distance $D_{CC}$ between the trailer coupler 212 and the vehicle tow ball 122 in the global coordinate system, then the coupler location estimation and tracking system 160 may instruct the path planning system 170 to initiate planning a path. The controller 150 executes a path planning system 170. The path planning system 170 determines the path causing the tow vehicle 100 to autonomously drive in the rearward direction R towards the trailer 200 and autonomously connect with the trailer 200.

As the tow vehicle 100 is autonomously maneuvering along the planned path, the path planning system 170 continuously updates the path based on continuously receiving updated information from the coupler location estimation and tracking system 160 and the sensor system 140. In some examples, an object detection system identifies one or more objects along the planned path and sends the path planning system 170 data relating to the position of the one or more objects. In this case, the path planning system 170 recalculates the planned path to avoid the one or more objects while also executing predetermined maneuvers to follow the path. In some examples, the path planning system determines a probability of collision and if the probability of collision exceeds a predetermined threshold, the path planning system 170 adjusts the path.

Once the path planning system 170 determines the planned path, then the vehicle controller 150 executes a driver assist system 180, which in turn includes path following behaviors 182. The path following behaviors 182 receive the planned path and executes one or more behaviors 182a-b that send commands 190 to the drive system 110, causing the tow vehicle 100 to autonomously drive along the planned path, which causes the tow vehicle 100 to autonomously connect to the trailer 200.

The path following behaviors 182 include, a braking behavior 182a, a speed behavior 182b, and a steering behavior 182c. In some examples, the path following behaviors 182 also include a hitch connect behavior, and a suspension adjustment behavior. Each behavior 182a-182c causes the tow vehicle 100 to take an action, such as driving backward, turning at a specific angle, breaking, speeding, slowing down, among others. The vehicle controller 150 may maneuver the tow vehicle 100 in any direction across the road surface by controlling the drive system 110, more specifically by issuing commands 190 to the drive system 110.

The braking behavior 182a may be executed to either stop the tow vehicle 100 or to slow down the tow vehicle 100 based on the planned path. The braking behavior 182a sends a signal or command 190 to the drive system 110, e.g., the brake system (not shown), to either stop the tow vehicle 100 or reduce the speed of the tow vehicle 100.

The speed behavior 182b may be executed to change the speed of the tow vehicle 100 by either accelerating or decelerating based on the planned path. The speed behavior 182b sends a signal or command 190 to the brake system 114 for decelerating or the acceleration system 116 for accelerating.

The steering behavior 182c may be executed to change the direction of the tow vehicle 100 based on the planned path. As such, the steering behavior 182c sends the acceleration system 116 a signal or command 190 indicative of an angle of steering causing the drive system 110 to change direction.

As previously discussed, the coupler location estimation and tracking system 160 determines the position of the trailer coupler 212 and tracks the coupler 212 in real time. In addition, the determined position is based on pixels within the received images 143 and in a global reference frame. The coupler location estimation and tracking system 160 uses distances to find the coupler 212 and is configured to filter out cloud points 402 that are not between the camera moving plane 310 and the ground plane 320. As such, the coupler location estimation and tracking system 160 is feasible for real time implementation.

The coupler location estimation and tracking system 160 receives images 143 from the rear camera 142a therefore, the coupler location estimation and tracking system 160 does not need prior knowledge of the size of the hitch ball 122 or the trailer coupler 212. Additionally, the coupler location estimation and tracking system 160 does not determine the position of the coupler 212 within the images, but instead determines the ROI 300 and then determines the coupler location 212 within the 3D point cloud 400. The coupler location estimation and tracking system 160 uses standard CPU with or without the use of GPUs or graphics accelerators.

Figure 6:
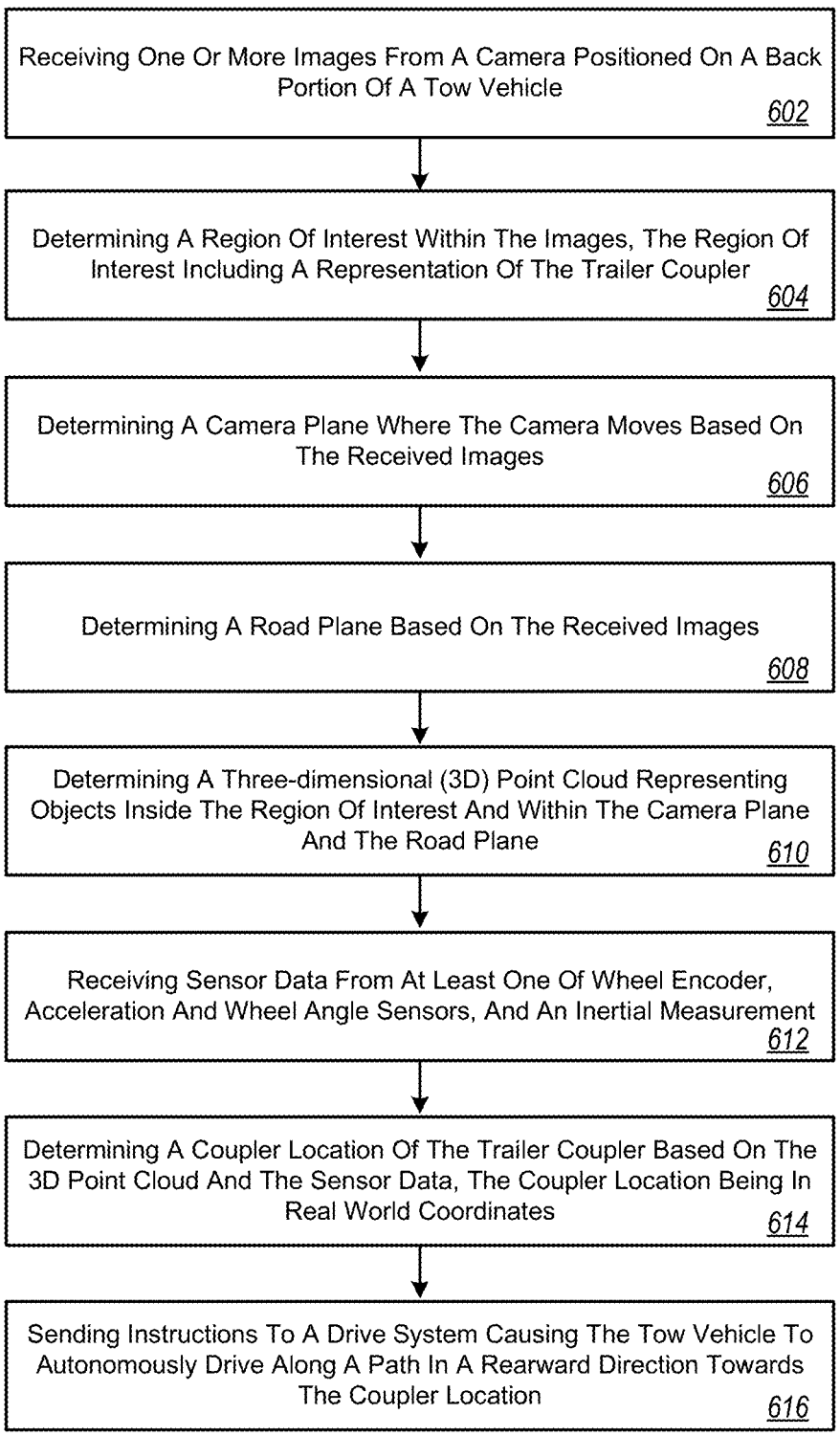
FIG. 6 is a schematic view of an exemplary arrangement of operations for detecting and localizing a coupler of a trailer hitch associated with a trailer behind a tow vehicle.

FIG. 6 provides an example arrangement of operations of a method 600 of detecting and localizing a coupler 212 of a trailer hitch 210 associated with a trailer 200 positioned behind a tow vehicle 100 using the system described in FIGS. 1-5.

At block 602, the method 600 includes receiving, at data processing hardware 152, one or more images 143 from a camera 142a positioned on a back portion of a tow vehicle 100 and in communication with the data processing hardware 152. At block 604, the method 600 includes determining, by the data processing hardware 152, a region of interest (ROI) 300 within the one or more images 143. The ROI 300 includes a representation of the trailer coupler 212. At block 606, the method 600 includes determining, by the data processing hardware 152, a camera plane 310 where the camera moves based on the received images 143. At block 608, the method 600 includes determining, by the data processing hardware 152, a road plane 320 based on the received images 143. At block 610, the method 600 includes determining, by the data processing hardware 152, a three-dimensional (3D) point cloud 400 representing objects inside the ROI 300 and within the camera plane 310 and the road plane 320. At block 612, the method 600 includes receiving, at the data processing hardware 152, sensor data 145 from at least one of wheel encoder 144, acceleration and wheel angle sensors 146, and an inertial measurement unit 148 in communication with the data processing hardware 152. At block 614, the method 600 includes determining, at the data processing hardware 152, a coupler location $L_{TC}$ of the trailer coupler 212 based on the 3D point cloud 400 and the sensor data 145. The coupler location $L_{TC}$ being in real world coordinates. At block 616, the method 600 includes sending, from the data processing hardware 152 to a drive system 110, instructions 190 causing the tow vehicle 100 to autonomously drive along a path in a rearward direction R towards the coupler location $L_{TC}$.

In some implementation, determining the ROI 300 within the images 143 includes: sending, from the data processing hardware 152 to a display 132, instructions to display the received images 143; and receiving, at the data processing hardware 152, a user selection 134 of the ROI 300.

The method 600 may also include projecting, by the data processing hardware 152, points 402 associated with the 3D point cloud 400 onto the camera plane 310 or the road plane 320. The method 600 may also include determining, by the data processing hardware 152, a distance between each point and the camera 142a. When the points associated with the 3D point cloud 400 are projected onto the camera plane 310, the method 600 includes determining the distance between each point and a center of the camera 142a. When the points 402 associated with the 3D point cloud 400 are projected onto the road plane 320, the method 600 includes, determining the distance between each point and a projection of the center of the camera onto the road plane. The method 600 may also include determining, by the data processing hardware 152, a shortest distance based on the determined distances. A projection of the 3D point associated with the shortest distance to the camera center onto the received images 143 is representative of a coupler pixel location within the images 143. The coupler location $L_{TC}$ is based on the coupler pixel location. In some examples, the method 600 includes determining, by the data processing hardware 152, a coupler height $H_{TC}$ based on a distance between the 3D point associated with the shortest distance and the road plane 320. The coupler location $L_{TC}$ includes the coupler height $H_{TC}$.

In some implementations, the method 600 includes determining, by the data processing hardware 152, a first distance $D_{CJ}$ between the trailer coupler 212 and the camera 142a based on the 3D point cloud 400. The method 600 also includes determining, by the data processing hardware 152, a second distance $D_{CC}$ between the trailer coupler 212 and a vehicle tow ball 122 based on the first distance $D_{CJ}$ less than a longitudinal distance $D_{VCC}$ between the camera 142a and a vehicle hitch ball 122. The path is based on the second distance $D_{CC}$.

In some examples, determining the 3D point cloud 400 of the ROI 300 includes executing one of a Visual Odometry (VO) algorithm, a Simultaneous Localization and Mapping (SLAM) algorithm, and a Structure from Motion (SfM) algorithm.

In some implementations, determining the camera plane 310 includes: determining at least three three-dimensional positions of the rear camera 142a from the received images 143; and determining the camera plane 310 based on the at least three three-dimensional positions. Determining the road plane 320 may include: determining a height of the camera from a road supporting the tow vehicle; and shifting the camera plane 310 by the height of the camera 142a toward the road 10.

In some examples, determining the road plane includes extracting at least three feature points from the images 143 including the road surface 10; associating a point of the 3D point cloud 400 with each of the feature points; and determining the road plane based on the at least three points of the 3D point cloud associated with the at least three feature points. In some examples, determining the camera plane includes determining a height of the camera from the road; and shifting the road plane by the height of the camera.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims.

What is claimed is:

1. A method of detecting and localizing a trailer coupler of a trailer, the method comprising:
   receiving, at data processing hardware, images from a camera positioned on a back portion of a tow vehicle and in communication with the data processing hardware;
   determining, by the data processing hardware, a region of interest within the images, the region of interest including a representation of the trailer coupler;
   determining, by the data processing hardware, a camera plane where the camera moves based on the received images;

determining, by the data processing hardware, a road plane based on the received images;

determining, by the data processing hardware, a three-dimensional (3D) point cloud representing objects inside the region of interest and within the camera plane and the road plane;

receiving, at the data processing hardware, sensor data from at least one of wheel encoder, acceleration and wheel angle sensors, and an inertial measurement unit in communication with the data processing hardware;

determining, at the data processing hardware, a coupler location of the trailer coupler based on the 3D point cloud and the sensor data, the coupler location being in real world coordinates; and sending, from the data processing hardware to a drive system, instructions causing the tow vehicle to autonomously drive along a path in a rearward direction towards the coupler location.

2. The method of claim 1, wherein determining the region of interest within the images includes:

sending, from the data processing hardware to a display, instructions to display the received images; and receiving, at the data processing hardware, a user selection of the region of interest.

3. The method of claim 1, further comprising:

projecting, by the data processing hardware, points associated with the 3D point cloud onto the camera plane or the road plane;

determining, by the data processing hardware, a distance between each point and the camera:

when the points associated with the 3D point cloud are projected onto the camera plane, determining the distance between each point and a center of the camera; and when the points associated with the 3D point cloud are projected onto the road plane, determining the distance between each point and a projection of the center of the camera onto the road plane; and determining, by the data processing hardware, a shortest distance based on the determined distances, a projection of the 3D point associated with the shortest distance onto the received images is representative of a coupler pixel location within the images, wherein the coupler location is based on the coupler pixel location.

4. The method of claim 3, further comprising:

determining, by the data processing hardware, a coupler height based on a distance between the 3D point associated with the shortest distance and the road plane, wherein the coupler location includes the coupler height.

5. The method of claim 1, further comprising:

determining, by the data processing hardware, a first distance between the trailer coupler and the camera based on the 3D point cloud; and determining, by the data processing hardware, a second distance between the trailer coupler and a vehicle tow ball based on the first distance less than a longitudinal distance between the camera and a vehicle hitch ball;

wherein the path is based on the second distance.

6. The method of claim 1, wherein determining the point cloud of the region of interest comprises executing one of a Visual Odometry (VO) algorithm, a Simultaneous Localization and Mapping (SLAM) algorithm, and a Structure from Motion (SfM) algorithm.

7. The method of claim 1, wherein determining the camera plane comprises:

determining, by the data processing hardware, at least three three-dimensional positions of the rear camera from the received images; and determining, by the data processing hardware, the camera plane based on the at least three three-dimensional positions.

8. The method of claim 1, wherein determining the road plane comprises:

determining a height of the camera from a road supporting the tow vehicle; and shifting the camera plane by the height of the camera.

9. The method of claim 1, wherein determining the road plane comprises:

extracting, by the data processing hardware, at least three feature points from the images including a road;

associating, by the data processing hardware, a point of the 3D point cloud with each of the feature points; and determining, by the data processing hardware, the road plane based on the at least three points of the 3D point cloud associated with the at least three feature points.

10. The method of claim 9, wherein determining the camera plane comprises:

determining, by the data processing hardware, a height of the camera from the road; and shifting, by the data processing hardware, the road plane by the height of the camera.

11. A system for detecting and localizing a trailer coupler of a trailer, the system comprising:

data processing hardware; and memory hardware in communication with the data processing hardware, the memory hardware storing instructions that when executed on the data processing hardware cause the data processing hardware to perform operations comprising:

receiving one or more images from a camera positioned on a back portion of a tow vehicle and in communication with the data processing hardware;

determining a region of interest within the images, the region of interest including a representation of the trailer coupler;

determining a camera plane where the camera moves based on the received images;

determining a road plane based on the received images;

determining a three-dimensional (3D) point cloud representing objects inside the region of interest and within the camera plane and the road plane;

receiving sensor data from at least one of wheel encoder, acceleration and wheel angle sensors, and an inertial measurement unit in communication with the data processing hardware;

determining a coupler location of the trailer coupler based on the 3D point cloud and the sensor data, the coupler location being in real world coordinates; and sending instructions to a drive system causing the tow vehicle to autonomously drive along a path in a rearward direction towards the coupler location.

12. The system of claim 11, wherein determining the region of interest within the images includes:

sending, instructions to a display causing the display of the received images; and receiving a user selection of the region of interest.

13. The system of claim 11, wherein the operations further comprise:

projecting points associated with the 3D point cloud onto the camera plane or the road plane;

determining a distance between each point and the camera:

when the points associated with the 3D point cloud are projected onto the camera plane, determining the distance between each point and a center of the camera; and when the points associated with the 3D point cloud are projected onto the road plane, determining the distance between each point and a projection of the center of the camera onto the road plane; and determining a shortest distance based on the determined distances, a projection of the 3D point associated with the shortest distance onto the received images is representative of a coupler pixel location within the images, wherein the coupler location is based on the coupler pixel location.

14. The system of claim 13, wherein the operations further comprise:

determining a coupler height based on a distance between the 3D point associated with the shortest distance and the road plane, wherein the coupler location includes the coupler height.

15. The system of claim 11, wherein the operations further comprise:

determining a first distance between the trailer coupler and the camera based on the 3D point cloud; and determining a second distance between the trailer coupler and a vehicle tow ball based on the first distance less than a longitudinal distance between the camera and a vehicle hitch ball;

wherein the path is based on the second distance.

16. The system of claim 11, wherein determining the 3D point cloud of the region of interest comprises executing one of a Visual Odometry (VO) algorithm, a Simultaneous Localization and Mapping (SLAM) algorithm, and a Structure from Motion (SfM) algorithm.

17. The system of claim 11, wherein determining the camera plane comprises:

determining, by the data processing hardware, at least three three-dimensional positions of the rear camera from the received images; and determining, by the data processing hardware, the camera plane based on the at least three three-dimensional positions.

18. The system of claim 11, wherein determining the road plane comprises:

determining a height of the camera from a road supporting the tow vehicle; and shifting the camera plane by the height of the camera.

19. The system of claim 11, wherein determining the road plane comprises:

extracting at least three feature points from the images including a road;

associating a point of the 3D point cloud with each of the feature points; and determining the road plane based on the at least three points of the 3D point cloud associated with the at least three feature points.

20. The system of claim 19, wherein determining the camera plane comprises:

determining a height of the camera from the road; and shifting the road plane by the height of the camera.

* * * * *